No. 746,520. PATENTED DEC. 8, 1903.
I. C. JONES.
BRICK TRUCK.
APPLICATION FILED JULY 13, 1903.
NO MODEL.
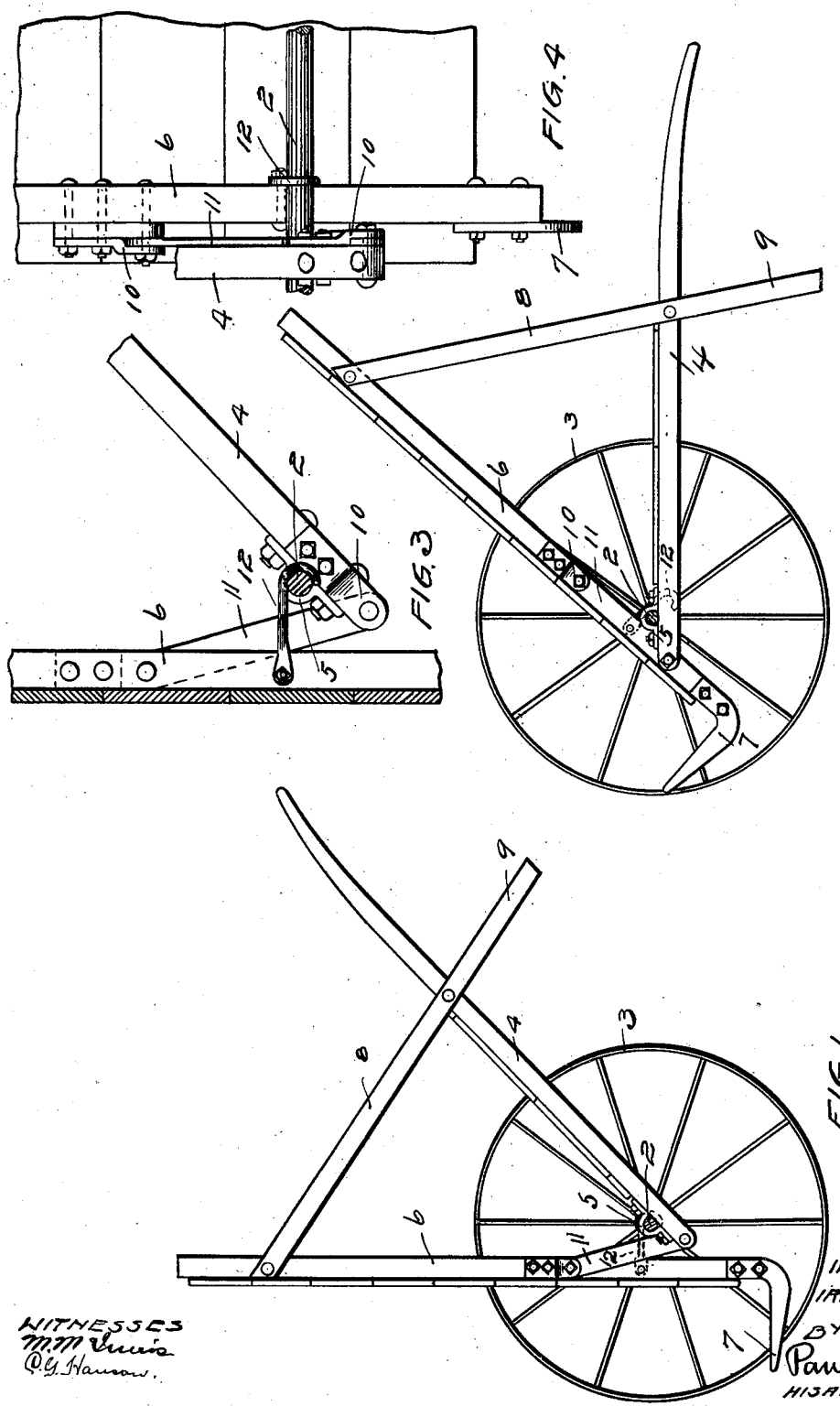

No. 746,520.

Patented December 8, 1903.

UNITED STATES PATENT OFFICE.

IRA C. JONES, OF GRANTSBURG, WISCONSIN.

BRICK-TRUCK.

SPECIFICATION forming part of Letters Patent No. 746,520, dated December 8, 1903.

Application filed July 13, 1903. Serial No. 165,324. (No model.)

*To all whom it may concern:*

Be it known that I, IRA C. JONES, of Grantsburg, county of Burnett and State of Wisconsin, have invented certain new and useful Improvements in Brick-Trucks, of which the following is a specification.

My invention relates to trucks designed particularly for use in brick-yards; and the object of the invention is to provide a truck equipped with large wheels, and hence easily moved, and having a platform whereon a pallet of bricks can be easily and conveniently loaded for removal from place to place in the yard and as readily unloaded when desired.
The invention consists generally in an axle having wheels and operating handle-bars rigidly secured thereto and a pallet-supporting platform pivotally connected with said handle-bars and arranged to be raised and lowered by the movement of the same.

Further, the invention consists in various constructions and combinations, all as hereinafter described, and particularly pointed out in the claims.

In the accompanying drawings, forming part of this specification, Figure 1 is a side elevation of a brick-truck embodying my invention, showing the platform in position to engage the load. Fig. 2 is a similar view showing the platform elevated and the handle-bars in their normal horizontal position when not in use. Fig. 3 is a detail sectional view showing the position of the parts connecting the handle-bars, axle, and platform when the latter is dropped down in position to engage the pallet. Fig. 4 is a view looking toward the rear of the truck, showing the manner of connecting the handle-bars and the platform.

In the drawings, 2 represents an axle having wheels 3, that are preferably much larger than wheels usually employed for this purpose, to facilitate the movement of the heavily-loaded truck from place to place.
4 represents the truck handle-bars, having their inner ends arranged beneath the axle and rigidly secured thereto by straps 5, said ends projecting, preferably, a few inches in front of the axle.
6 is a platform having at its lower end forwardly-projecting fingers 7, that are rigidly secured to said platform, substantially at right angles thereto. These fingers are adapted to pass under a brick-pallet and support the same when the platform is raised. The upper end of said platform is pivotally connected with the handle-bars by bars 8, which preferably have ends 9, that extend below the handle-bars and form supporting-legs therefor when the truck is not in use. The inner ends of the handle-bars are provided with brackets 10, that are connected to similar brackets on the platform 6 by means of pivoted strap-links 11. These links are of suitable length to bring their points of pivotal connection with the platform the proper distance above the inner ends of the handle-bars and are arranged to swing freely on their pivots and allow the platform to drop down near the ground in position to pick up a loaded brick-pallet and when raised to allow the said platform to swing backward against the axle and rest thereon. The bars 8 being pivoted at both ends will swing freely and allow the platform to adjust itself automatically to its depressed or raised position. To prevent the platform from swinging down to the ground when the handle-bars are raised, I prefer to provide hooks 12, that are pivoted on the said platform and have bent ends that extend partially around the axle and limit the downward movement of the platform, while allowing it when raised to swing freely until it contacts with the axle.

The method of using my improved brick-truck is as follows: The operator upon approaching a pallet of bricks which is arranged upon suitable supports in an upright position and has a series of pockets or pigeonholes one above the other, wherein the green bricks are placed, will tilt the handlebars to the position shown in Fig. 1 and allow the platform to swing down to its depressed position, when the fingers at the lower end thereof can be readily inserted beneath the pallet. The operator will then bear down on the handle-bars which through their link connection with the platform, the axle and wheels acting as a fulcrum, will raise the platform and its load until it reaches a point where its weight will cause it to swing back on its pivots and rest against the axle. During this operation of raising the platform and its load its upper end will be guided and supported by the bars 8, which will swing freely on their pivots and accommodate themselves to the different positions of the platform. As soon as the platform has been elevated and tilted back against the axle the operator can easily roll the truck to the point where the bricks are to be dried or any other place in the yard, and upon elevating the handle-bars the platform will swing downward and deposit the legs or lower end of the pallet upon the ground. The truck can then be removed and the operation repeated.

I claim as my invention—

1. The combination, with an axle and its wheels, of handle-bars rigidly secured thereto and projecting forward beyond the axle, a platform having forwardly-projecting fingers at its lower end, links pivotally connecting the forward ends of said handle-bars and said platform, and allowing it to drop back and rest upon said axle when the handle-bars are depressed.

2. The combination, with an axle and its wheels, of handle-bars secured thereto, a platform having forwardly-projecting fingers at its lower end, links pivotally connecting said platform and said handle-bars, pivoted means for guiding the upper end of said platform, and means engaging said axle for limiting the downward swing of said platform.

3. A brick-truck comprising an axle and its wheels, handle-bars secured to said axle, a pallet-supporting platform having forwardly-projecting fingers at its lower end, bars pivotally connecting the upper end of said platform and said handle-bars and forming therewith a triangular frame, links pivoted at their lower ends to said bars and at their upper ends to said platform above said axle and acting as continuations of said handle-bars to lift said platform when said bars are depressed.

4. A brick-truck, comprising an axle and its wheels, handle-bars secured to said axle, a platform having forwardly-projecting fingers at its lower end, links pivotally connecting said platform with said handle-bars, hooks pivoted on said platform and loosely engaging said axle, and bars pivotally connecting the upper end of said platform with said handle-bars.

5. A brick-truck, comprising an axle and its wheels, handle-bars extending beneath and in advance of said axle and rigidly secured thereto, a platform having forwardly-extending fingers at its lower end, links pivotally connecting the forward end of said handle-bars in advance of said axle with said platform, the pivotal connections of said links with said platform being above said axle, hooks pivoted on said platform and arranged to engage said axle and limit the downward swing of said platform, and bars pivotally connecting the upper end of said platform with said handle-bars, substantially as described.

6. A brick-truck comprising an axle and its wheels, handle-bars secured to said axle, a pallet-supporting platform having forwardly-projecting fingers at its lower end, bars pivotally connecting the upper end of said platform and said handle-bars and forming therewith a triangular frame, links pivoted at their lower ends to said bars and at their upper ends to said platform above said axle and acting as continuations of said handle-bars to lift said platform when said bars are depressed, and means for limiting the forward-swinging movement of said platform.

7. The combination, with an axle and its wheels, of handle-bars secured to said axle, a platform having forwardly-projecting fingers at its lower end, means pivotally connecting said handle-bars and said platform and arranged to allow the latter to swing back against said axle when said handle-bars are depressed, and means engaging said axle for limiting the forward swing of said platform when said bars are raised.

In witness whereof I have hereunto set my hand this 18th day of June, 1903.

IRA C. JONES.

In presence of—
L. R. ROBERTS,
STANLEY OLSON.